United States Patent [19]

Powers

[11] 4,146,950
[45] Apr. 3, 1979

[54] METHODS FOR FORMING BUBBLE CAP ASSEMBLIES FOR A GAS AND LIQUID CONTACT APPARATUS

[75] Inventor: John R. Powers, Port Arthur, Tex.

[73] Assignee: Texaco Inc., New York, N.Y.

[21] Appl. No.: 845,200

[22] Filed: Oct. 25, 1977

Related U.S. Application Data

[63] Continuation-in-part of Ser. No. 712,451, Aug. 6, 1976, Pat. No. 4,059,877.

[51] Int. Cl.² .................. B23P 15/00; B01D 47/12
[52] U.S. Cl. ............................ 29/157 R; 261/114 A; 403/375; 228/170; 228/173 F
[58] Field of Search ............. 29/157 R, 157.4, 455 R; 261/114 A; 285/191, 205; 403/354, 375, 377; 228/170, 173 A, 173 F

[56] References Cited

U.S. PATENT DOCUMENTS

| | | | |
|---|---|---|---|
| 938,102 | 10/1909 | Wise | 285/191 |
| 2,142,231 | 1/1939 | Allen | 261/114 A |
| 2,320,822 | 6/1943 | Kerrigan | 261/114 A |
| 2,382,489 | 8/1945 | Koppel | 285/205 |
| 2,438,536 | 3/1948 | Cairns | 261/114 A |
| 2,480,862 | 9/1949 | Johnson | 261/114 A |
| 2,510,556 | 6/1950 | Collins | 261/114 A |
| 2,525,218 | 10/1950 | Glitsch | 261/114 A |
| 2,528,919 | 11/1950 | Stone et al. | 285/205 |
| 2,578,881 | 12/1951 | Dunn | 261/114 A |
| 2,580,260 | 12/1951 | Winters | 261/114 A |
| 2,602,652 | 7/1952 | Haynes | 261/114 A |
| 2,645,469 | 7/1953 | Plossl et al. | 261/114 A |
| 2,653,018 | 9/1953 | Dunn | 261/114 A |
| 2,705,136 | 3/1955 | Glitsch | 261/114 A |
| 2,710,177 | 6/1955 | Young et al. | 261/114 A |
| 2,785,882 | 3/1957 | Wansink et al. | 261/114 A |
| 2,797,907 | 7/1957 | De Bie | 261/114 A |
| 2,921,777 | 1/1960 | Hepp | 261/114 A |
| 3,749,425 | 7/1973 | Honland | 285/191 |
| 4,059,877 | 11/1977 | Powers | 29/157 R |

FOREIGN PATENT DOCUMENTS 216478 7/1961 Austria .................. 261/114 A

Primary Examiner—C. W. Lanham
Assistant Examiner—Daniel C. Crane
Attorney, Agent, or Firm—Carl G. Ries; Thomas H. Whaley; Theron H. Nichols

[57] ABSTRACT

One basic method for forming a bubble cap assembly held together with a hold-down stud for sealing a hole in a tray deck comprises (1) forming an inner tubular sleeve having a lower flanged end telescopic with the inner surface of a tubular riser having a lower flanged end, and (2) sealing the lower flanged ends of both the telescopic tubular riser and the inner tubular sleeve with gasket means to the upper and lower peripheral surfaces around the hole for providing a double seal between the tray deck and the bubble cap assembly, for minimizing leakage, and for assuring proper alignment of the bubble cap assembly relative to the tray deck. At least one method step of three different methods for assembling each of three different modifications comprises securing a spider on the lower end of the hold-down stud for placing it in tension for compressing the two sealing gasket means in one embodiment, fastening the hold-down stud lower end to a cross bar which is welded to the internal surfaces of the inner tubular sleeve for forming the second embodiment and for forming the third embodiment, cutting horizontally into two opposite cylindrical sides of the upper portion of the inner tubular sleeve for a substantial distance, and bending the two cut bent portions inwardly into a kidney shape until contiguous with the hold-down stud to which it then is welded.

8 Claims, 8 Drawing Figures

METHODS FOR FORMING BUBBLE CAP ASSEMBLIES FOR A GAS AND LIQUID CONTACT APPARATUS

BACKGROUND OF THE INVENTION

This is a Continuation-In-Part of application Ser. No. 712,451, filed Aug. 6, 1976, now U.S. Pat. No. 4,059,877, issued Nov. 29, 1977.

In the chemical and petroleum refining industries, gases are contacted with liquids in a gas and liquid contact apparatus, as in a contact tower for fractionating, absorbing, scrubbing, and the like.

The three different bubble cap assemblies made by the disclosed methods are utilized in a gas and liquid contact apparatus comprising a stack of perforated trays in a tower with downcomers and weirs for flowing fluids from the top of the tower down over a tray deck to a weir, over the weir into a downcomer to the next tray deck below, and thus across and down through all trays consecutively until reaching the bottom where it is discharged, while a gas is introduced in the tower at the bottom and is forced through the holes in each tray deck covered with bubble cap assemblies which insure that all gas in each chamber has bubbled through a tray of liquid in the bottom of that chamber before passing upwardly through the next tray of liquid to exhaust out the top of the tower.

Thus as this counterflow of gas and liquid takes place, any constituents in the gas are condensed by contact with the liquid and are discharged therewith at the bottom of the tower, while any remaining unabsorbed gas and additional vapor is exhausted from the top of the tower with the other gases.

Improved methods for making different bubble cap assemblies including means for mounting them on a tray of a gas and liquid contact apparatus is highly desired. Disclosed herein are three improved methods for forming three different bubble cap assemblies.

OBJECTS OF THE INVENTION

Accordingly, a primary object of this invention is to provide a few improved methods for forming a bubble cap assembly for mounting over holes in tray decks of a gas and liquid contact apparatus with both an inner tubular sleeve and a tubular riser with annular flanges on each of the inner tubular sleeve and the tubular riser for providing a double seal between the tray deck and the bubble cap assembly for minimizing leakage.

Another primary object of this invention is to provide an improved method for forming a bubble cap assembly that assures proper alignment of the bubble cap assembly relative to the tray deck.

A further object of this invention is to provide three different methods for forming three different bubble cap assemblies.

A still further object of this invention is to provide a method for forming a bubble cap assembly that has a reduced number of assembly pieces for reducing the number of fabrication steps for reducing fabrication costs of the complete bubble cap assembly.

A further object of this invention is to provide a method for forming a bubble cap assembly that is easy to operate, is of simple configuration, is economical to build and assemble, and is of greater efficiency for use in a gas and liquid contact apparatus.

Other objects and various advantages of the disclosed methods for forming three bubble cap assemblies will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, a few forms or mechanisms for carrying out the methods of the invention wherein like reference numerals have been employed to indicate similar parts in the several views in which.

The invention disclosed herein, the scope of which being defined in the appended claims, is not limited in its application to the details of construction and arrangement of parts shown and described for carrying out the disclosed methods, since the invention is capable of other embodiments formed by other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE BASIC METHODS

Figure 1:
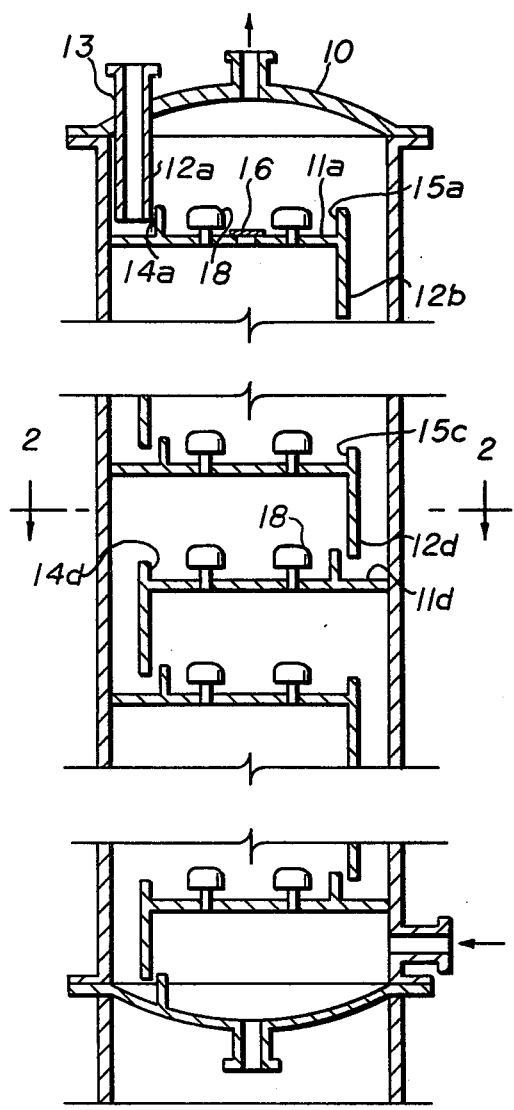
FIG. 1 is a schematic diagrammatical vertical sectional view of a fractionation tower including the new bubble cap assemblies throughout.

This invention comprises basically three methods for forming three different bubble cap assemblies for mounting over holes in tray decks of a gas and liquid contact apparatus as illustrated in FIG. 1.

A basic method for forming a bubble cap assembly 18 for sealing a hole (17) having upper and lower peripheral surfaces in a tray deck (11) comprises, (1) Forming an inner tubular sleeve (27) having a lower flanged end (29) telescopic with the inner surface of a tubular riser (25) having a lower flanged end (26), and (2) Sealing the lower flanged ends (26), (29), of the telescopic tubular riser (25) and inner tubular sleeve (27) with gasket means (28), (30) to the upper and lower peripheral surfaces around the hole (17) for providing a double seal between the tray deck (11) and the bubble cap assembly (18) for minimizing leakage and for assuring proper alignment of the bubble cap assembly relative to the tray deck.

In a bubble cap assembly (18) for sealing a hole (17) in a tray deck (11) in a contact tower for fractionating, absorbing, scrubbing, and the like comprising a bubble cap (19) held down on top of a spider (21) positioned on a tubular body (25-27) with a hold-down stud (32) protruding up through the body, spider, and bubble cap, a method for forming the tubular body comprises:

(1) Forming an inner tubular sleeve having an outside diameter substantially equal to the hole diameter, and (2) Forming a tubular riser continguous with the major portion of the outer surface of the inner tubular sleeve for minimizing leakage in the bubble cap assembly and for assuring proper alignment of the bubble cap assembly relative to the tray deck.

A more detailed basic method for forming a bubble cap assembly (18) over a hole (17) having an upper and lower peripheral surfaces in a tray deck (11) of a gas and liquid contact apparatus comprises, (1) Forming an outwardly extending annular flange (26) on the lower end of a tubular (25) riser having an internal diameter substantially equal to the hole (11) diameter, (2) Positioning the tubular riser annular flange over the upper peripheral surface of the hole in the tray deck (11), (3) Inserting an annular gasket seal (28) having an inside diameter substantially equal to the hole diameter between the tubular riser annulus flange (26) and the upper peripheral surface around the hole (17) in the tray deck (11);

(4) Forming an outwardly extending annular flange (29) on the lower end of an inner tubular sleeve (27);

(5) Positioning the inner tubular sleeve annular flange (29) under the lower peripheral surface of the hole in the tray deck;

(6) Inserting an annular gasket seal (30) having an inside diameter substantially equal to the hole diameter between the inner tubular sleeve annular flange (29) and the lower peripheral surface around the hole in the tray deck;

(7) Inserting the tubular inner sleeve (27) up through the hole (17) in the tray deck (11) and the tubular riser (2) thereon contiguous with the inner surface of the tubular riser to clamp the upper and lower peripheral surfaces of the tray deck (11) between the respective tubular riser and inner tubular sleeve annular flanges;

(8) Mounting a spider (21) having a sleeve (22) therein on the tubular riser (25);

(9) Mounting a bubble cap (19) on the spider;

(10) Attaching a hold-down stud (32) to the inner tubular sleeve for extending up through at least a portion of the inner tubular sleeve and the tubular riser to protrude through the top of the bubble cap; and

(11) Attaching a fastening means (35) on the top of the hold-down stud (32) protruding from the top of the bubble cap assembly (18) for applying pressure to both of the annular gasket seals (28), (30) for assuring proper alignment of the bubble cap assembly relative to the tray deck (11), and for providing a double seal between the tray deck and the bubble cap assembly for minimizing leakage.

METHOD FOR FORMING THE BUBBLE CAP ASSEMBLY OF FIGS. 3-4

Figure 3:
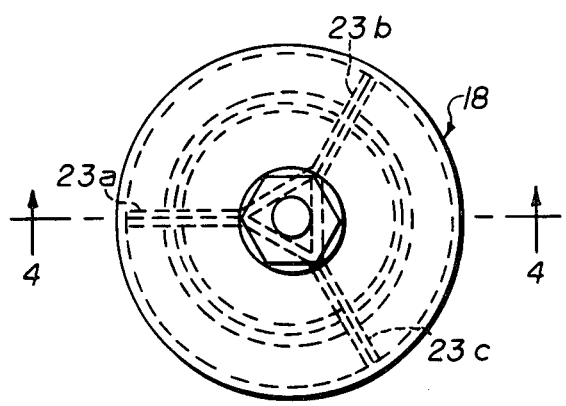
FIG. 3 is a top view of one modification of a bubble cap assembly.
Figure 4:
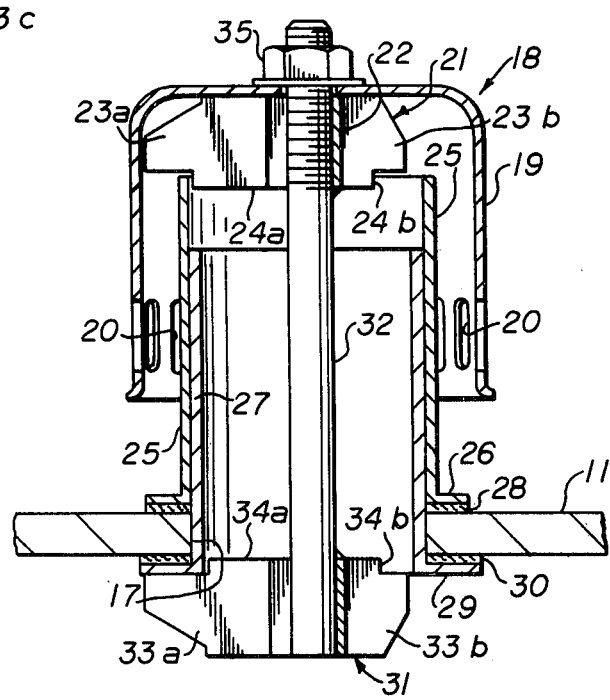
FIG. 4 is a vertical sectional view taken at 4—4 on FIG. 3.

Method steps that may be added to the above basic methods for forming the bubble cap assembly (18) over a hole (17) in a tray deck (11) as illustrated in FIGS. 3-4 comprise:

(1) Forming equally spaced apart lower spider legs (33a, 33b) radiating outwardly from the lower end of the hold-down stud (32) beyond the outer peripheral edge of the hole (17);

(2) Inserting an upper portion (34b) of each lower spider leg internally of the bottom of the inner tubular sleeve (27) whereby tightening of the fastening means (35) on the top of the hold-down stud (32) applies pressure to both of the inner tubular sleeve annular sealing flange (29) and the tubular riser annular sealing flange (26) for sealing off the hole (17), for assuring proper alignment of the bubble cap assembly (18) relative to the tray deck (11), and for providing a double seal (28,30) between the tray deck (11) and the bubble cap assembly (18) for minimizing leakage.

METHOD FOR FORMING THE BUBBLE CAP ASSEMBLY OF FIG. 5

Figure 5:
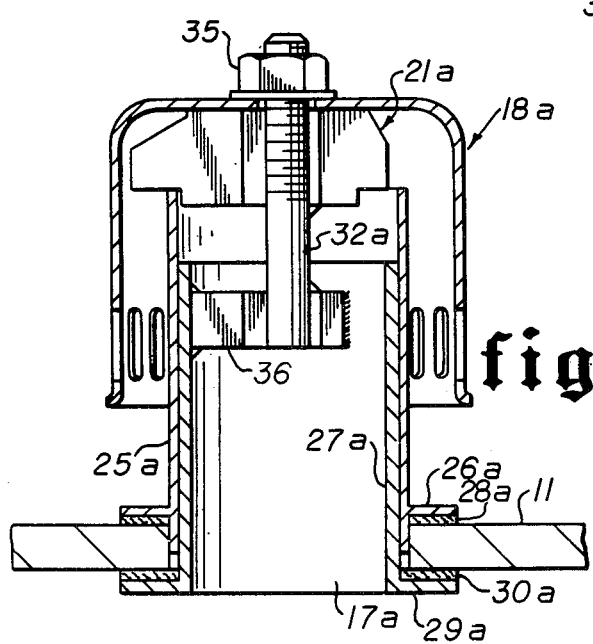
FIG. 5 is a second modification of a bubble cap assembly.

Method steps that can be further added to the above basic methods for forming the bubble cap assembly (18) shown in FIG. 5 comprise:

(1) Forming a sleeve (22) of a size large enough for passing the hold-down stud (32) through;

(2) Rigidly securing spider legs (23a, 23b) to the sleeve to radiate outwardly therefrom; and (3) Inserting a portion (24a, 24b) of each spider leg internally of the upper end of the tubular riser (25) for centering the hold-down stud (32) and bubble cap (19) over the hole (17) in the tray deck (11) of the bubble tower (10).

METHOD FOR FORMING THE BUBBLE CAP ASSEMBLY OF FIGS. 6-8

Figure 6:
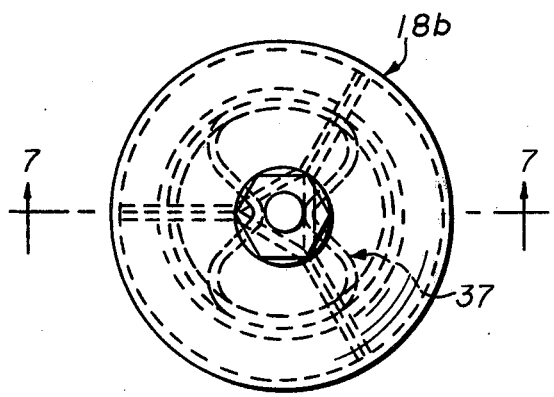
FIG. 6 is a top view of a third bubble cap assembly.
Figure 8:
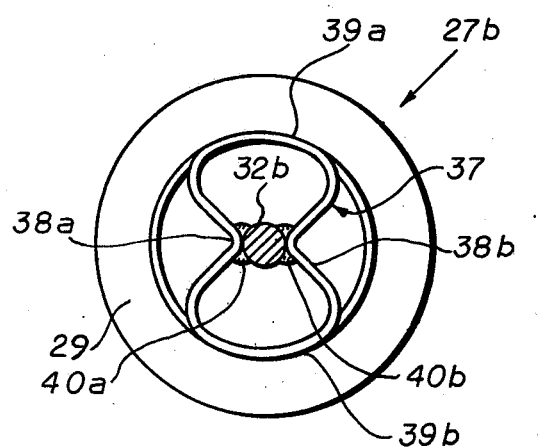
FIG. 8 is a top view of the inner tubular sleeve per se of FIG. 7 illustrated with the retaining bolt welded thereto, and with the bubble cap and cylindrical riser removed.
Figure 7:
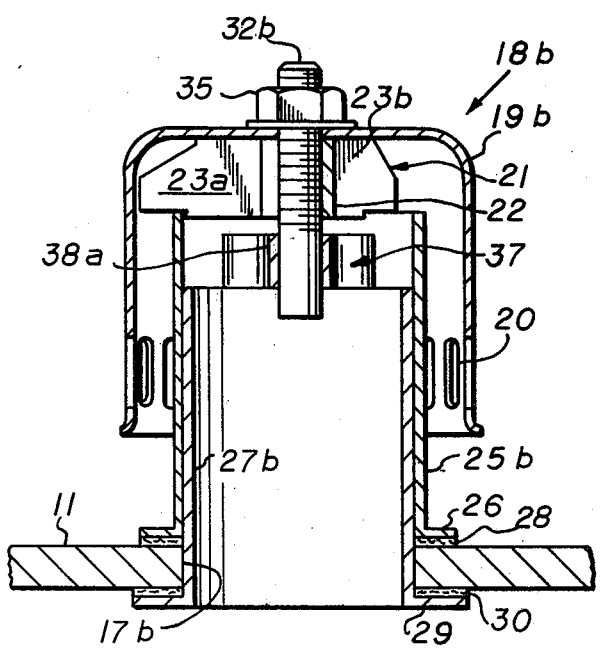
FIG. 7 is a vertical sectional view taken at 7—7 on FIG. 6.

Method steps that may be added to the basic methods set forth for forming the bubble cap assembly of FIGS. 6-8 comprise:

(1) Cutting horizontally into two opposite cylindrical sides of the upper portion (38a, 38b) of the inner tubular sleeve (27b) to a distance indwardly to include at least substantially 100° of the circumference of each of the two opposite cylindrical sides;

(2) Bending inwardly into a kidney shape the two cut portions (38a, 38b), until contiguous with a hold-down stud (32b);

(3) Securing the two bent cut portions (38a, 38b) to the hold-down stud (32b) whereby the inner tubular sleeve (27b), is rigidly attached to the hold-down stud (32b).

DESCRIPTION OF THE THREE BUBBLE CAPS FORMED BY THE ABOVE METHODS

FIG. 1 discloses a conventional gas and liquid contact apparatus 10 but illustrated with the new invention therein. This contact apparatus 10 comprises a multiplicity of tray decks stacked one above the other, each tray deck being the enantiomorphic projection of the one below. Tray deck 11a, for example, has a downcomer 12a which receives liquid from the top of the fractionation tower inlet 13. The liquid that passes down the downcomer enters the tray deck after passing over the first weir 14a. Then the liquid spreads out over the tray deck to a height as controlled by a far or second weir 15a on the far side of the tray deck. A manhole 16 provides access for adjustment and/or repair of the tray deck and the mechanisms mounted thereon. Any number of manholes may be provided. Vapor or gas holes are formed all over the tray deck, hole 17a being a typical hole. Each of the gas holes 17 has a bubble cap assembly 18 therein for causing the gas to bubble through the liquid but preventing liquid from passing down through the hole below. A suitable frame or brace structure supports the tray deck. As the liquid passes over the second weir 15a it drops down downcomer 12b to the next tray deck, below. The rest of the trays are similar. The principal feature of this disclosure is the bubble cap assembly 18 as illustrated in greater detail in FIGS. 3-8.

Figure 2:
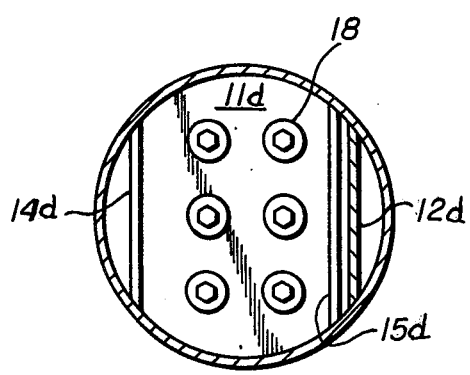
FIG. 2 is a sectional view taken at 2—2 on FIG. 1.

FIG. 2, a horizontal sectional view at 2—2 on FIG. 1, illustrates a typical tray deck 11d with six typical bubble cap assemblies 18 downcomer, 12d, first weir 15d, and second weir 14d.

MODIFICATIONS OF FIGS. 3 AND 4

FIG. 3 is a top view of the first modification of the bubble cap assembly of FIG. 4.

FIG. 4 discloses a bubble cap assembly 18 which fills the hole to allow gas to pass up from the tray deck below up through his bubble cap assembly, through the liquid and then allows the gas to bubble up to the surface of the liquid and up through the tray deck above. A bell-shaped bubble cap 19 with slots 20 in the skirt for allowing the gas to bubble out or pass out from inside the bell to the liquid outside. Bubble cap 19 rests on or is supported by spider 21. This spider comprises a sleeve 22 with three equally spaced arms 23a, 23b, and 23c fixed thereto (the latter arm not shown) and radiating outwardly therefrom. Arms 23a-23c have a downwardly projecting portion 24a-24c (the latter not shown) on each fitted down internally of a tubular riser 25 for centering the spider and the bubble cap thereover.

With the spider 21 and bell-shaped bubblecap 19 resting on the top of tubular riser 25, the bottom of the tubular riser rests on the upper surface of the peripheral edge of a hole 17. This bottom portion of the tubular riser comprises an annular flange 26 formed on the outer surface at the lower end of the tubular riser for resting on top of the tray deck peripheral edge surface around the hole. A gasket 28 is positioned between this annular flange 26 and the tray deck 11. An inner tubular sleeve 27 is formed internally of and concentric with the tubular riser 25 and contiguous with the inner surface thereof for extending down below the tubular riser internally of the hole 17 and protruding slightly down below the hole. Another annular flange 29 is formed on the protruding portion of the inner tubular sleeve 27 and extends outwardly of the inner tubular sleeve contiguous with the lower or under surface of the tray deck 11 around the peripheral edge of the hole. Between this annular flange 29 and the tray deck is positioned another annular gasket 30. Under the bottom of the hole is a lower spider 31 formed integral with a hold-down stud 32. This lower spider likewise is formed with three protruding or radiating arms from the lower end of the hold-down stud.

An important feature of the disclosed inner tubular sleeve and the tubular riser is that a major portion of the cylindrical surface of each is in sliding contact with each other ensuring a fluid-tight and gas-tight joint. Principally, proper alignment is ensured.

While any number of arms may be utilized as for the lower spider, three are preferred as described and illustrated herein. Lower spider 31 has arms 33a, 33b, and 33c (not shown in FIG. 4), each having a portion 34a, 34b and 34c, protruding up into the lower end of the inner tubular sleeve 27. These protruding portions of the lower spider center the spider as well as the lower end of the hold-down stud 32 to which the spider is securely fastened. The hold-down stud 32 extends from the bottom of the hole up through the bubble cap assembly including the sleeve 22 of the upper spider 21 and then protrudes up through the bubble cap 19. A fastening device 35, such as but not limited to, a nut and washer are screwed on to the top thereof for compressing all parts of the assembly together. With compression placed on all parts, particularly the tubular riser and inner tubular sleeve annular flanges 26 and 29, respectively, the gaskets 28 and 30 thereunder are compressed into a gas and liquid sealing position and condition.

MODIFICATION OF FIG. 5

FIG. 5 illustrates, in vertical section, a modified bubble cap assembly 18a. Here, the bubble cap portion of the bubble cap assembly is similar to the first embodiment, as is the supporting upper spider 21a. The tubular riser 25a of the second embodiment protrudes down internally of the hole 17a with its annular flange 26a secured and made integral with the tubular riser at a spaced distance slightly above the bottom edge of the tubular riser. This annular flange 26a likewise rests on and is sealed to the upper peripheral edge of the hole 17a in the deck tray 11 with gasket 28a. The inner tubular sleeve 27a of this embodiment lies internally and contiguously with the inner surface of the tubular riser 25a and protrudes down through the hole and ends with an annular flange 29a formed integral therewith, which flange protrudes out and is sealed with a sealing gasket 30a to the peripheral lower edge surface of the hole 17a in the tray deck. An attachment bar 36 comprising three legs, preferably, is welded to the inner surface of the inner tubular sleeve 27a and likewise the attachment bar is secured, as by welding, to the bottom of the stud 32a whereby tightening of the nut on the upper end of the stud compressing the assembly together, including particularly the two gaskets, to form a second gas and fluid-tight bubble cap assembly 18a. The smaller parts required in this modification of FIG. 5 results in a less expensive and easier to manufacture bubble cap assembly.

MODIFICATIONS OF FIG. 6-8

FIGS. 6-8 disclose the third embodiment of a bubble cap assembly wherein FIG. 6 is a top view, FIG. 7 is a vertical sectional view taken at 7—7 on FIG. 6, and FIG. 8 is a top view of the inner tubular sleeve 27b per se.

The conventional lower spider for attaching the lower end of a hold-down stud to the lower end of the inner tubular sleeve as illustrated in the first modification of FIGS. 3-4 is not required in this embodiment for holding the individual elements of the bubble cap assembly together. This lower spider for interconnecting the bottoms of some of the other elements of the assembly is one element that is eliminated in the above disclosed bubble cap assembly. Instead, a short hold-down stud is attached to the top of the inner tubular sleeve.

As described in the method above for forming this embodiment, a horizontal saw cut is made on each side of the inner tubular sleeve for a distance or about 120° of the cylindrical wall near the top. Then the kidney shaped upper portion 37, FIGS. 7 and 8, is formed by bending in or cold rolling in the side portions 38a and 38b, FIG. 8, until they are contiguous with the hold-down stud 32b as seen in FIG. 8. Also as viewed in FIG. 8, the rearward and forward portions, 39a and 39b respectively, of the kidney shaped upper portion 37 are formed integral with the remaining lower portion of the inner tubular sleeve 27b. The bent in side portions 38a and 38b, FIG. 8, of the kidney shaped upper portion 37 are welded at their centers to a bubble cap retaining or hold-down stud 32b with welds, or the like, 40a and 40b.

The lower sealing portion of the bubble cap assembly 18b, FIGS. 6 and 7, is similar to that of 18 in FIGS. 3 and 4. A sealing gasket 28, FIG. 7, is inserted between the annular flange 26 on the bottom of the tubular riser 25b, FIG. 7, and the peripheral surface around the hole 17b in the tray deck 11. The second annular gasket 30 is inserted between the annular flange 29 on the bottom of the inner tubular sleeve 27b and the peripheral under surface around the hole 17b in the tray deck.

As viewed in FIG. 7, the hold-down stud 32b extends upwardly from the welded connection, through the kidney shaped connecting portion 37 on the inner tubular sleeve up through the sleeve 22 of the spider 21, and through the center top of the bubble cap 19b where a fastening device, such as but not limited to, a nut and washer 35, or the like, are tightened down on the stud 32b for maintaining the bubble cap assembled. With compression placed on all parts by tightening of nut 35, particularly on the upper and lower riser annular flanges and the gaskets thereunder, a gas-tight and a liquid-tight seal is formed around the hole 17b.

Further, a major portion of the surfaces of the tubular riser and the inner tubular sleeve are in sliding contact with each other for insuring a gas-tight and a fluid-tight fit between the two tubular elements.

Further, the number of assembly pieces are reduced for reducing the number of fabrication steps for reducing fabrication costs of the complete bubble cap assembly, for assuring proper alignment of the bubble cap assembly relative to the tray deck, and for providing a double seal between the tray deck and the bubble cap assembly for minimizing leakage.

Obviously other methods may be utilized for forming other bubble cap assemblies.

Accordingly, it will be seen that at least three methods are disclosed for forming three embodiments of a bubble cap assembly that will operate in a manner which meets each of the objects set forth hereinbefore.

While only three methods of the invention for forming three mechanisms have been disclosed, it will be evident that various other methods are possible in the arrangement and construction of the disclosed modifications, and other methods for forming bubble cap assemblies are possible without departing from the scope of the invention and it is accordingly desired to comprehend within the purview of this invention such modifications as may be considered to fall within the scope of the appended claims.

I claim:

1. A method for forming a tubular body for a bubble cap assembly for sealing a hole in a tray deck comprising the steps of,
   (a) forming an inner tubular sleeve for extending up from inside the hole in the tray deck,
   (b) cutting straight and normal to the longitudinal axis of the tubular sleeve into two opposite cylindrical sides of the upper portion of the inner tubular sleeve to a distance inwardly to include at least substantially 100° of the circumference of each of the two opposite cylindrical sides for forming two cut portions,
   (c) bending the two cut portions inwardly in a direction normal to the tubular sleeve longitudinal axis into two bent cut portions for forming a kidney shape contiguous with a hold-down stud, and
   (d) welding the two bent cut portions to the hold-down stud whereby the inner tubular sleeve is rigidly attached to the hold-down stud for forming an improved tubular body for the bubble cap assembly, and for reducing the number of assembly pieces for reducing the number of fabrication steps for lowering fabrication costs of the complete bubble cap assembly.

2. A method for forming a bubble cap assembly for sealing a hole in a tray deck comprising,
   (a) forming an inner tubular sleeve having an outside diameter substantially equal to the hole diameter,
   (b) cutting straight into two opposite cylindrical sides of the upper portion of the inner tubular sleeve normal to the longitudinal axis of the tubular sleeve to a distance inwardly to include at least substantially 100° of the circumference of each of the two opposite cylindrical sides for forming two cut portions on the tubular sleeve,
   (c) bending the two cut portions inwardly in a direction normal to the tubular sleeve longitudinal axis into two bent cut portions for forming a kidney shape contiguous with a hold-down stud,
   (d) securing the two bent cut portions to the hold-down stud for providing a rigid attachment of the inner tubular sleeve to the hold-down stud for forming an improved tubular body for the bubble cap assembly,
   (e) forming a tubular riser contiguous with the major portion of the outer surface of the inner tubular sleeve for minimizing leakage in the bubble cap assembly between the inner tubular sleeve and the tubular riser and for assuring proper alignment of the bubble cap assembly relative to the tray deck,
   (f) positioning the tubular riser and inner tubular sleeve over the hole in the tray deck, and
   (g) placing a spider and bubble cap over the hold-down stud on top of the tubular riser and fastening the spider and bubble cap on top of the hold-down stud for centering the bubble cap and spider over the hole, for assuring proper alignment of the bubble cap assembly relative to the tray deck for minimizing leakage, and for reducing the number of assembly pieces for reducing the number of fabrication steps for lowering fabrication costs of the complete bubble cap assembly.

3. A method for forming a bubble cap assembly over a hole having upper and lower peripheral surfaces in a tray deck comprising the steps of,
   (a) forming an inner tubular sleeve for extending up from inside the hole in the tray deck,
   (b) cutting straight and normal to the longitudinal axis of the tubular sleeve into two opposite cylindrical sides of the upper portion of the inner tubular sleeve to a distance inwardly to include at least substantially 100° of the circumference of each of the two opposite cylindrical sides for forming two cut portions,
   (c) bending the two cut portions into two bent cut portions,
   (d) securing the two bent cut portions to a hold-down stud, p1 (e) providing the inner tubular sleeve with an annular flange on the bottom thereof with a gasket on the annular flange and engageable with the bottom peripheral surface around the hole in the tray deck in the gas and liquid contact apparatus, (f) sealing a tubular riser with an annular flange on the bottom thereof with a gasket under the riser annular flange to the upper peripheral surface around the hole in the tray deck, (g) inserting the inner tublar sleeve up through the hole in the tray deck and the tubular riser thereon contiguous with the inner surface of the tubular riser and hole to clamp the upper and lower peripheral surfaces of the tray deck between the respective tubular riser and inner tubular sleeve annular flanges, (h) extending the hold-down stud secured to the inner tubular sleeve upwardly centrally of the tubular riser, (i) positioning a spider over the hold-down stud and on top of the tubular riser, (j) forming a bell shaped bubble cap with a hole in the top thereof and with elongated slots spaced apart in the skirt of the bell, (k) lowering the bubble cap down over the hold-down stud and on top of the spider, and (l) attaching fastening means to the top of the hold-down stud protruding up through the bubble cap for centering the bubble cap and top spider over the hole and for applying pressure to both of the inner tubular sleeve annular sealing flange and the tubular riser annular sealing flange for sealing off the hole for assuring proper alignment of the bubble cap assembly relative to the tray deck, for providing a double seal between the tray deck and the bubble assembly for minimizing leakage, and for reducing the number of assembly pieces for reducing the number of fabrication steps for lowering fabrication costs of the complete bubble cap assembly.

4. A method as recited in claim 3 wherein the third step (c) comprises,
(a) bending the two cut portions inwardly in a direction normal to the tubular sleeve longitudinal axis into the two bent cut portions for forming a kidney shaped upper portion of the inner tubular sleeve contiguous with the hold-down stud.

5. A method as recited in claim 3 wherein the fourth step (d) comprises,
(a) welding the two bent cut portions to the hold-down stud whereby the inner tubular sleeve is rigidly attached to the hold-down stud for forming an improved tubular body for the bubble cap assembly.

6. A method for forming a bubble cap assembly over a hole having upper and lower peripheral surfaces in a tray deck of a gas and liquid contact apparatus comprising the steps of,
(a) forming an outwardly extending annular flange on the lower end of a tubular riser having an internal diameter substantially equal to the hole diameter,
(b) positioning the tubular riser annular flange over the upper peripheral surface of the hole in the tray deck,
(c) inserting an annular gasket seal having an inside diameter substantially equal to the hole diameter between the tubular riser annulus flange and the upper peripheral surface around the hole in the tray deck,
(d) forming an inner tubular sleeve for extending up from inside the hole in the tray deck,
(e) cutting straight and normal to the longitudinal axis of the tubular sleeve into two opposite cylindrical sides of the upper portion of the inner tubular sleeve to a distance inwardly to include at least substantially 100° of the circumference of each of the two opposite cylindrical sides for forming two cut portions,
(f) bending the two cut portions into two bent cut portions,
(g) securing the two bent cut portions to a hold-down stud,
(h) forming an outwardly extending annular flange on the lower end of the inner tubular sleeve,
(i) positioning the inner tubular sleeve annular flange under the lower peripheral surface of the hole in the tray deck,
(j) inserting an annular gasket seal having an inside diameter substantially equal to the hole diameter between the tubular inner sleeve annular flange and the lower peripheral surface around the hole in the tray deck,
(k) inserting the inner tubular sleeve up through the hole in the tray deck and the tubular riser thereon contiguous with the inner surface of the tubular riser to clamp the upper and lower peripheral surfaces of the tray deck between the respective tubular riser and inner tubular sleeve annular flanges,
(l) mounting a spider having a sleeve therein on the tubular riser,
(m) mounting a bubble cap on the spider,
(n) extending the hold-down stud secured to the inner tubular sleeve up through at least a portion of the inner tubular sleeve and the tubular riser to protrude through the top of the bubble cap, and
(o) attaching a fastening means on the top of the hold-down stud protruding from the top of the bubble cap assembly for applying pressure to both of the annular gasket seals on the upper and lower peripheral surfaces of the hole for assuring proper alignment of the bubble cap assembly relative to the tray deck and for providing a double seal between the tray deck and the bubble cap assembly for minimizing leakage, and for reducing the number of assemby pieces for reducing the number of fabrication steps for lowering fabrication costs of the complete bubble cap assembly.

7. A method as recited in claim 6 wherein the sixth step (f) comprises,
(a) bending the two cut portions inwardly in a direction normal to the tubular sleeve longitudinal axis into the two bent cut portions for forming a kidney shaped upper portion of the inner tubular sleeve contiguous with the hold-down stud.

8. A method as recited in claim 6 wherein the seventh step (g) comprises,
(a) welding the two bent cut portions to the hold-down stud whereby the inner tubular sleeve is rigidly attached to the hold-down stud for forming an improved tubular body for the bubble cap assembly.

* * * * *